United States Patent [19]

Krüger

[11] Patent Number: 4,770,288
[45] Date of Patent: Sep. 13, 1988

[54] BELT-TYPE BUCKET ELEVATOR

[75] Inventor: Rolf Krüger, Lübeck, Fed. Rep. of Germany

[73] Assignee: O&K Orenstein & Koppel Aktiengesellschaft, Berlin

[21] Appl. No.: 37,164

[22] Filed: Apr. 10, 1987

[30] Foreign Application Priority Data

Apr. 12, 1986 [DE] Fed. Rep. of Germany ....... 3612424

[51] Int. Cl.[4] ............................................. B65G 17/36
[52] U.S. Cl. ..................................... 198/711; 198/714
[58] Field of Search ............... 198/706, 711, 712, 713, 198/714; 37/69, 191, 192

[56] References Cited

U.S. PATENT DOCUMENTS

| 347,963 | 8/1886 | Seavey et al. | 198/711 X |
| 1,186,036 | 6/1916 | Poulter | 198/712 X |
| 3,147,848 | 9/1964 | Churchill | 198/711 X |
| 4,154,333 | 5/1979 | Lapeyre | 198/713 X |
| 4,506,781 | 3/1985 | Briggs | 198/711 |

FOREIGN PATENT DOCUMENTS

| 337601 | 10/1976 | Australia. | |
| 111596 | 9/1954 | Fed. Rep. of Germany. | |
| 0932118 | 7/1955 | Fed. Rep. of Germany. | |
| 1531856 | 1/1970 | Fed. Rep. of Germany. | |
| 7627157 | 3/1977 | Fed. Rep. of Germany. | |
| 2732932 | 2/1978 | Fed. Rep. of Germany | 198/711 |
| 0540997 | 6/1922 | France | 198/711 |
| 0120408 | 10/1970 | Norway | 198/711 |
| 315062 | 8/1956 | Switzerland. | |

Primary Examiner—Robert J. Spar
Assistant Examiner—Lyle Kimms
Attorney, Agent, or Firm—Toren, McGeady & Associates

[57] ABSTRACT

A belt-type bucket elevator in which each bucket is connected to the belt by two movable fastenings arranged one behind the other in conveying direction. Each bucket is divided into front and rear bucket portions along a dividing plane extending between the fastening joints perpendicularly or approximately perpendicularly to the plane of the belt. The two bucket portions are connected to each other by connecting joints mounted coaxially on the side walls of the two bucket portions.

13 Claims, 2 Drawing Sheets

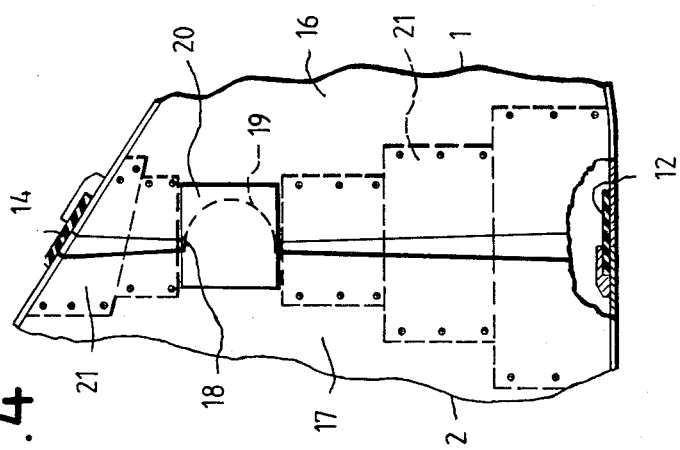
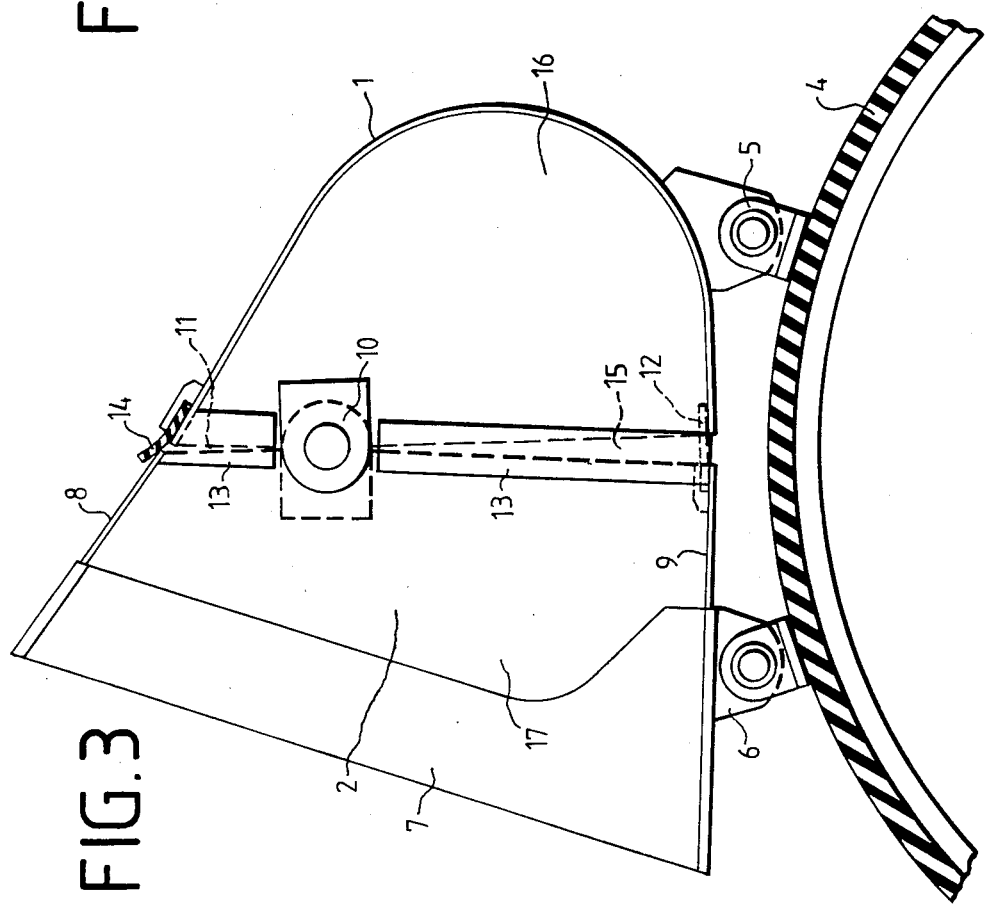

BELT-TYPE BUCKET ELEVATOR

BACKGROUND OF THE INVENTION

1. Field of the Invention

The present invention relates to a belt-type bucket elevator in which each bucket is fastened to the belt by means of movable fastenings arranged one behind the other in conveying direction.

2. Description of the Prior Art

German Offenlegungsschrift No. 2,732,932 describes and shows belt-type bucket elevators of the type described above which are particularly suitable for coarse-grained materials to be conveyed. As described in German Offenlegungsschrift No. 2,732,932, it is known to fasten buckets to belts by means of a fastening or fixing strip with screws or by means of a flat steel strip vulcanized into the belt. In addition to the pendulous support of the buckets on the belt, these types of fastenings have the disadvantage that material may get jammed between the belt and the back of the bucket and, consequently, the belt may become damaged. Fastening the buckets by means of a flat steel strip vulcanized into the belt is very expensive. When the buckets are fastened to the belt by means of eyelets vulcanized onto the belt, the belt is suitable only for excavating operations requiring small forces because the adhering force of the eyelets to the belt is small. The German Offenlegungsschrift No. 2,737,932 has as its object to provide a bucket elevator which is suitable also for coarse material to be conveyed and for high conveying capacities. In particular, the fastening of the bucket to the belt is to be able to absorb high excavation forces, is to ensure a quiet operation of the belt and a long service life.

In accordance with German Offenlegungsschrift No. 2,732,932, in the belt-type bucket elevator, each bucket is fastened to the belt by means of at least four fastening strips arranged into rows. The rear wall of the bucket is mounted by means of fastening angle pieces screwed onto the rear wall, so that the rear wall of the bucket is maintained a distance away from the belt and jamming of material to be conveyed is avoided. This known manner of fastening the buckets to the belt by means of two rows of fastening strips is intended to prevent a pendulous motion of the buckets. The distance between the belt and the rear walls of the buckets can be selected in accordance with the grain size of the material to be conveyed. In addition, the distance between the belt and the rear walls of the buckets can be adjusted subsequently as desired.

German Pat. No. 932,118 describes and shows a bucket elevator for granular material, such as barley, green malt or the like. The buckets of the excavator are fastened to two link chains. In the discussion of the prior art, German Pat. No. 932,118 mentions that bucket elevators are known in which deflecting walls are mounted in the front of the openings of the bucket, so that these excavators can be used for vertically as well as horizontally transporting the material to be conveyed. However, the buckets are formed in one piece. The known excavators have the disadvantage that the buckets do not by themselves take up the material to be conveyed; rather, the material must be conveyed into the buckets by means of a chute. Particularly at the location where the buckets travel around a guide roller, the buckets only incompletely receive the material to be conveyed. It is the object of the German Pat. No. 932,118 to provide a bucket excavator for granular material and particularly a bucket elevator to be used for traveling heap malting, in which the danger of falling and crushed grains in the bucket operation are essentially avoided. This object is to be met in that each bucket includes a main bucket portion and a front bucket portion connected in an articulated manner to the main bucket portion. The front bucket portion is mounted in front of the opening of the two-piece buckets seen in conveying direction and forms a deflecting wall. This deflecting wall catches and prevents from falling those particles of the granular material which could be thrown out of the buckets due to acceleration at the locations where the belt is guided from one conveying direction into a subsequent different conveying direction.

It is, therefore, the primary object of the present invention to provide a belt-type bucket elevator in which particularly small guide rollers can be used, which can be operated with relatively high conveying speeds and in which the danger of the formation of wedge-shaped spaces between the belt and each bucket during travel of the bucket around the guide roller is avoided as much as possible, so that additionally the danger is reduced that such wedge-shaped spaces be filled with material which would impair the operation of the belt. Specifically, these wedge-shaped spaces would prevent the bucket from returning into the normal position when the belt travels along a straight line. In addition, it should be possible to use simple fastening means for the buckets. By improving the manner of operation of the belt, the speed of travel of the belt can also be improved.

SUMMARY OF THE INVENTION

In accordance with the present invention, each bucket of the belt-type bucket elevator is divided into two bucket portions. The bucket is divided tranversely of the travel direction of the belt and the dividing plane extends perpendicularly or approximately perpendicularly relative to the plane of the belt and intersects the plane of the belt between the front and rear fastening joints which connect the bucket with the belt. Coaxially mounted connecting joints are provided for connecting the side walls of the bucket portion.

The present invention provides the advantage that guide rollers can be used in a belt-type bucket elevator which have a relatively small diameter. This is because the invention avoids the formation of harmful wedge-shaped intermediate spaces between the bottom wall of the bucket and the belt when the belt travels around the guide rollers. After traveling around the guide roller, the bucket is not prevented from returning into its normal position, for example, in the straight portion of the bucket elevator. Thus, the travel of the bucket elevator belt around the guide rollers is not impaired.

In addition, the bucket elevator according to the invention can be operated at relatively high speeds. Simple fastening means can be used for fastening the buckets to the belt because the fastening is essentially free of squeezing forces. No harmful loads are exerted on the fastening means or the belt. The fastening provided according to the present invention results in a connection between bucket and belt which is practically free of squeezing forces no matter what the length of the radius of curvature of the deflection roller. The joint between the two bucket halves and the two movable fastening joints of the bucket halves with the belt together form a support triangle, wherein the length of the base of this triangle between the fastening points with the belt is flexible. This length of the base is adjusted in accordance with the distance between the fastening joints with the belt during travel of the belt along a straight path and travel along positive or negative curvatures.

The joint between the bucket halves and the joints for fastening the bucket halves to the belt can be constructed in a variety of different ways. A simple embodiment resides in constructing the joint between the two bucket halves as a pin-shape joint without bushing or as a joint with bushing. The joint may also be a rubber bushing joint which is able to absorb relative rotations. All joints may also be constructed as single-ball joints. However, the construction of the joints always depends upon the respective requirements in accordance with the structural materials used.

In order to facilitate the relative change of position of the two bucket halves during travel around the deflection rollers even if the side walls of the two bucket halves are in alignment with each other, the side walls may be constructed so as to taper rearwardly, so that a relative movement of the bucket halves is possible in the region where the side wall edges face each other. The rearward tapers extend radially from the joints.

In order to cover the space formed between the edges of the side walls of the divided bucket facing each other when the bucket moves around a bend, the side walls of one of the bucket halves may be provided with cover strips, so that material is prevented from entering when the edges of the bucket portions move away from each other. When loads are applied to the cover strips during operation, the cover strips may be flat iron sections, flat steel sections or the like. The remaining cover strips may be made of an elastic material, such as rubber or the like. Each of these cover strips are fastened to only one of the bucket halves in order to allow relative movement to the other bucket half.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 3 is a side elevational view of the bucket of FIG. 1 shown during travel around a guide roller; and FIG. 4 is a partial side view of a bucket according to the invention, showing a possible embodiment of the connection between the bucket halves.

DETAILED DESCRIPTION OF THE INVENTION

Figure 2:
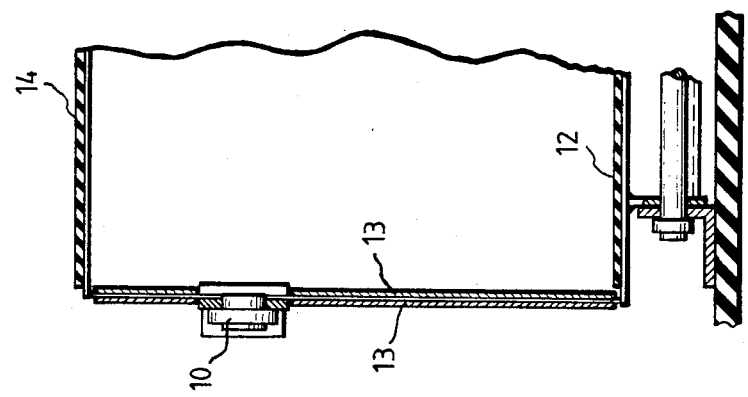
FIG. 2 is a partial sectional view taken along sectional plane A-B in FIG. 1.

The bucket according to the invention includes a rear bucket portion 1 and a front bucket portion 2. The two bucket portions 1 and 2 may be manufactured by cutting a normal closed bucket into two portions along a cutting plane to be discussed later.

In the illustrated embodiment, the bucket is divided along a cutting plane 3 which extends perpendicularly or approximately perpendicularly to belt 4. Rear bucket portion 1 is fastened to belt 4 by means of fastening joint 5. Front bucket portion 2 is fastened to belt 4 by means of fastening joint 6. Front bucket portion 2 has a cutting edge 7.

Figure 1:
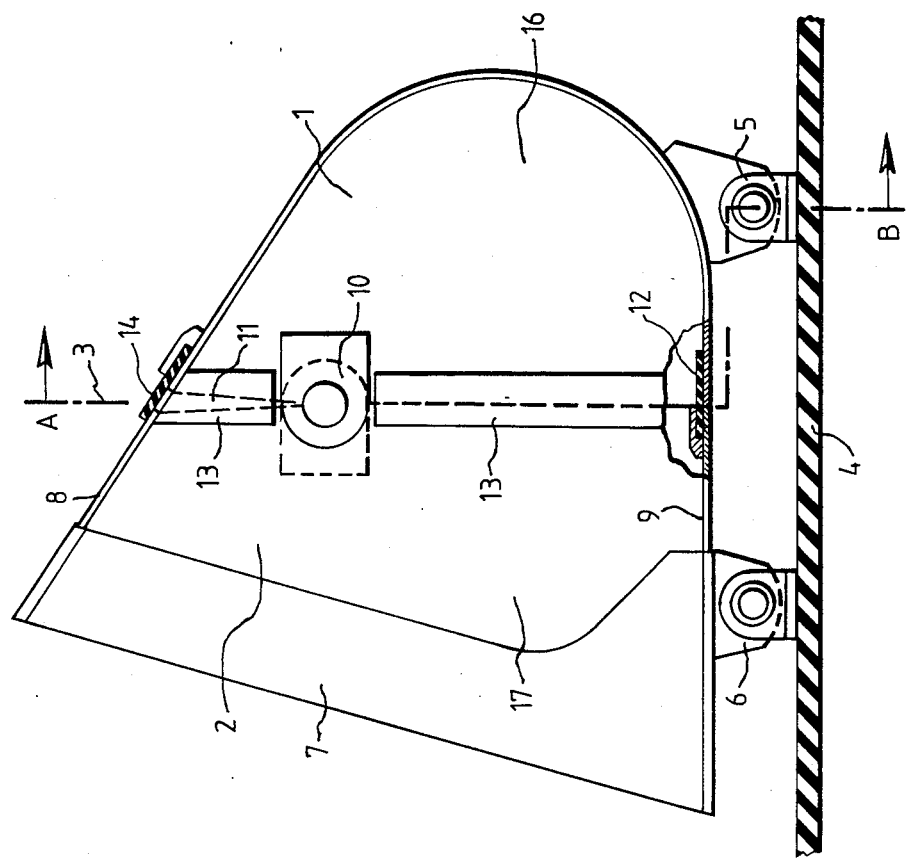
FIG. 1 is a side elevational view of a bucket in accordance with the present invention.

The upper walls 8 and the bottom walls 9 of the two bucket portions 1 and 2 are in alignment in the position illustrated in FIG. 1 because both bucket portions 1 and 2 have been manufactured by cutting a bucket into two halves. The two bucket portions 1 and 2 are connected to each other by means of a joint, for example, a pin-type joint 10, arranged in the upper area of cutting plane 3. Instead of the joint without a bushing as illustrated in the drawing, a joint with bushing or rubber bushing or a single-ball joint may be used. Any other suitable joint may also be used.

The side walls of the two bucket portions 1 and 2 or of one of the bucket portions may be formed so as to taper rearwardly above the joint 10, as indicated by reference numeral 11 in FIG. 1. This rearwardly extending taper makes possible a travel of the buckets along convex curvatures as well as concave curvatures. A movement of the two bucket portions relative to each other into the position illustrated in FIG. 3 is possible without any structural components being subjected to squeezing forces.

Front bucket portion 2 has at its lower edge in the area of cutting plane 3 a rubber strip 12, so that material is prevented from penetrating the gap between the two bucket portions 1 and 2.

Similarly, on the two side walls of each front bucket portion 2 in the middle area of the cutting plane 3 above and below joint 10 are provided cover strips 13 which also serve to cover gaps forming between the front and rear bucket portions. Another cover strip 14 is provided on the upper wall of the bucket. Cover strip 14 is made of rubber and, in the illustrated embodiment, is shown fastened to rear bucket portion 1 in order to point out the possibilities of fastening the various cover strips.

FIG. 3 shows the positions of the two bucket portions 1 and 2 relative to each other when the bucket travels around a guide roller. During the travel around the guide roller, the two fastening joints 5 and 6 move apart from each other, so that a gap 15 is formed between the two bucket portions 1 and 2. Gap 15 is covered by cover strip 13.

FIG. 4 shows a very simple connection of the two bucket portions 1 and 2. In this illustrated embodiment, the side walls of the front and rear bucket portions are in alignment. The side wall of either the front or rear bucket portions is provided in the area of the joint with a projection 18, while the side wall 16 of the other bucket portion is provided with a corresponding recess 19. Thus, the two bucket portions engage each other in the manner of a joint.

To avoid movements of the two bucket portions 1 and 2 in lateral direction, the outer surfaces and/or the inner surfaces of the side walls 16 and 17 are provided with cover plates 20. In addition, the bucket portions 1 and 2 are connected to each other with rubber strips 21 which facilitate movement of the bucket portions 1 and 2 relative to each other and prevent material being conveyed from falling out. During relative movement of the bucket portions 1 and 2, the rubber strips 21 located farther away from joint 18, 19 are stretched more than the rubber strips 21 located near joint 18, 19.

While specific embodiments of the invention have been shown and described in detail to illustrate the application of the inventive principle, it will be understood that the invention may be embodied otherwise without departing from such principles.

I claim:

1. A belt-type bucket elevator, comprising a belt and a plurality of buckets and said belt travelling in a linear path and in a curved path around guide means, each bucket having an upper wall, a lower wall and side walls, front and rear fastening joints for movably connecting each bucket to the belt, each bucket being divided into first and second bucket portions, the division being transversely of the travel direction of the belt along a plane extending perpendicularly or approximately perpendicularly relative to the plane of the belt and intersecting the plane of the belt between the front and rear fastening joints, and coaxially mounted connecting joints for pivotally connecting the side walls of the first and second bucket portions for relative movements therebetween, whereby as each bucket travels from the linear path to the curved path, the curvature of the curved path causes the first and the second bucket portions to pivot relative to each other about the connecting joints.

2. The bucket elevator according to claim 1, wherein the connecting joints are pin-type joints.

3. The bucket elevator according to claim 1, wherein the division of each bucket is along a cutting plane, the connecting joints being located in the upper area of the cutting plane.

4. The bucket elevator according to claim 1, wherein the upper and lower walls of the first and second bucket portions are in alignment and the side walls taper rearwardly away from the connecting joints, so that the bucket portions can move relative to each other.

5. The bucket elevator according to claim 4, comprising cover strips mounted on the edges of the upper walls, lower walls and side walls of the first bucket portion or the second bucket portion for covering the gaps existing between the edges.

6. The bucket elevator according to claim 5, wherein the cover strips are flat iron sections or flat steel sections.

7. The bucket elevator according to claim 5, wherein the cover strips are of an elastic material.

8. The bucket elevator according to claim 7, wherein the elastic material is rubber.

9. The bucket elevator according to claim 1, wherein the side walls of the front and rear bucket portions overlap.

10. The bucket elevator according to claim 1, wherein the connecting joints are formed by openings defined in the side walls and a pin extending through the openings.

11. The bucket elevator according to claim 1, wherein the side walls are in alignment and the connecting joints are formed by a projection in the side wall of one of the front or rear bucket portions and a corresponding recess in the side wall of the other bucket portion.

12. The bucket elevator according to claim 11, comprising cover plates attached to the inner or outer surfaces of the side walls for preventing lateral movement of the bucket portions.

13. The bucket elevator according to claim 11, comprising rubber strips attached to the inner or outer surfaces of both bucket portions, so that during relative movement of the bucket portions, the rubber strips located farther away from the connecting joints are stretched more than the rubber strips located near the connecting joints.

* * * * *